(12) United States Patent
Huang et al.

(10) Patent No.: US 11,954,951 B2
(45) Date of Patent: Apr. 9, 2024

(54) COMPONENT OF ELECTRIC VEHICLE, DATA COLLECTING SYSTEM FOR ELECTRIC VEHICLE, AND DATA COLLECTING METHOD FOR ELECTRIC VEHICLE

(71) Applicant: Delta Electronics, Inc., Taoyuan (TW)

(72) Inventors: Sheng-Chi Huang, Taoyuan (TW); Yun-Chun Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 363 days.

(21) Appl. No.: 17/483,367

(22) Filed: Sep. 23, 2021

(65) Prior Publication Data

US 2022/0392272 A1 Dec. 8, 2022

(30) Foreign Application Priority Data

Jun. 3, 2021 (CN) .................. 202110618663.X

(51) Int. Cl.
| | | |
|---|---|---|
| *B60R 16/023* | (2006.01) | |
| *G07C 5/00* | (2006.01) | |
| *G07C 5/10* | (2006.01) | |
| *H04L 12/40* | (2006.01) | |

(52) U.S. Cl.
CPC .......... *G07C 5/008* (2013.01); *B60R 16/0232* (2013.01); *G07C 5/10* (2013.01); *H04L 12/4013* (2013.01); *H04L 2012/40273* (2013.01)

(58) Field of Classification Search
CPC ...... G07C 5/008; G07C 5/10; B60R 16/0232; G04L 12/4013; G04L 12/40273

USPC .......................................................... 701/31.4
See application file for complete search history.

(56) References Cited

U.S. PATENT DOCUMENTS

| | | | |
|---|---|---|---|
| 7,496,457 B2 | 2/2009 | Fujita et al. | |
| 10,686,976 B2 * | 6/2020 | Nalepka | G06V 20/56 |
| 11,593,917 B2 * | 2/2023 | Hoyer | G06T 3/0068 |

(Continued)

FOREIGN PATENT DOCUMENTS

| | | |
|---|---|---|
| CN | 100475143 C | 4/2009 |
| CN | 103939081 B | 4/2016 |
| TW | 201937447 A | 9/2019 |

*Primary Examiner* — Richard A Goldman
(74) *Attorney, Agent, or Firm* — Chun-Ming Shih; HDLS IPR SERVICES

(57) ABSTRACT

A data collecting system including a component assembled in an electric vehicle, a data collector connected to the component through a bus of the electric vehicle, and a debug server connected to the data collector is disclosed. The component collects different data from the electric vehicle and performs different sending procedures respectively under different situations including: a regular sending-procedure sends regular data to the bus based on a regular frequency; a high-speed sending-procedure starts collecting high-speed data and sending the same to the bus based on a high-speed frequency after a condition is satisfied; and a high-resolution sending-procedure sends high-resolution data to the bus after an error occurs, wherein the high-resolution data is collected within a period of time before and after the error occurs. The data collector collects these data from the bus. The debug server analyzes the data collected by the data collector.

11 Claims, 11 Drawing Sheets

(56) References Cited

U.S. PATENT DOCUMENTS

| | | | |
|---|---|---|---|
| 11,789,843 B1* | 10/2023 | Cridge | G06F 11/3072 340/517 |
| 2002/0045804 A1* | 4/2002 | Christopherson | A61B 5/0002 128/903 |
| 2003/0153847 A1* | 8/2003 | Sandler | A61B 7/008 600/587 |
| 2006/0077256 A1* | 4/2006 | Silvemail | H04N 5/76 348/143 |
| 2011/0285982 A1 | 11/2011 | Breed | |
| 2013/0090853 A1* | 4/2013 | Anderson | H04L 67/04 702/6 |
| 2013/0124945 A1* | 5/2013 | Hu | G06F 11/1048 714/773 |
| 2013/0274950 A1* | 10/2013 | Richardson | G08G 1/0112 701/1 |
| 2013/0282228 A1* | 10/2013 | Cawse | G07C 5/085 701/32.2 |
| 2013/0289837 A1* | 10/2013 | Beams | B60W 30/18027 701/51 |
| 2015/0074312 A1* | 3/2015 | Barus | G06F 13/4068 710/306 |
| 2016/0203655 A1* | 7/2016 | Leisenring | G07C 5/085 701/1 |
| 2018/0068449 A1* | 3/2018 | Malaika | G06V 40/19 |
| 2019/0122543 A1* | 4/2019 | Matus | G08G 1/0133 |
| 2019/0156600 A1 | 5/2019 | Potyrailo et al. | |
| 2019/0187666 A1* | 6/2019 | Sugiyama | G05B 19/4065 |
| 2019/0270457 A1 | 9/2019 | Chen et al. | |
| 2021/0108926 A1 | 4/2021 | Tran | |
| 2022/0021836 A1* | 1/2022 | Sakakibara | H04N 25/75 |
| 2022/0392272 A1* | 12/2022 | Huang | G07C 5/10 |
| 2023/0261474 A1* | 8/2023 | Thorsen | H02J 3/381 700/286 |
| 2023/0308158 A1* | 9/2023 | Haustein | H04B 7/06952 370/329 |

\* cited by examiner

COMPONENT OF ELECTRIC VEHICLE, DATA COLLECTING SYSTEM FOR ELECTRIC VEHICLE, AND DATA COLLECTING METHOD FOR ELECTRIC VEHICLE

BACKGROUND OF THE DISCLOSURE

Technical Field

The present disclosure relates to an electric vehicle, and specifically relates to a component of an electric vehicle, and a data collecting system and a data collecting method used to collect and analyze data of the component of the electric vehicle.

Description of Related Art

Generally, a car manufacturer only collects operating data of an electric vehicle through a bus of the electric vehicle. In order to focus on the problems related to major components of the electric vehicle, the car manufacturer usually collects and only collects a low-resolution data of the electric vehicle such as an error code of the bus.

The quantity of the collected data is insufficient, the resolution of the collected data is too low, and the collected data lacks of time information. When an error occurs to the electric vehicle, a manufacturer of the component may only obtain an oral report from a client of the electric vehicle and a low-resolution bus data collected from the electric vehicle. After receiving an error notification, the component manufacturer is usually unable to analyze an actual cause of the error due to the insufficient data, and the component manufacturer is hard to reproduce the error for being analyzed.

SUMMARY OF THE DISCLOSURE

The present disclosure is directed to a component of an electric vehicle, a data collecting system for the electric vehicle, and a data collecting method for the electric vehicle, which may respectively send a low-speed data, a high-speed data, and a high-resolution data having an absolute time information of a component to a bus of the electric vehicle through a dynamic data sending procedure, and send such data from the bus to a debug server so that an engineer at a remote end may obtain an effective data for analysis in real-time.

In one of the embodiments, the component of the present disclosure is arranged in the electric vehicle and connected to a bus of the electric vehicle, and the component includes:

a component communication unit, continuously collecting a regular data of a component data of the component in accordance with a regular frequency, and performing a regular data sending procedure to send the regular data to the bus in accordance with the regular frequency;

a condition determining unit, recording at least one triggering condition, and determining whether the triggering condition is satisfied based on the component data;

a high-speed data collecting unit connected with the condition determining unit and the component communication unit, being triggered by the condition determining unit to start continuously collecting a high-speed data of the component data in accordance with a high-speed frequency after the component data is determined to satisfy the triggering condition, wherein the component communicating unit is configured to perform a high-speed data sending procedure to send the high-speed data to the bus in accordance with the high-speed frequency, wherein the high-speed frequency is higher than the regular frequency;

a component storage unit, connected with the component communication unit;

a high-resolution data collecting unit, continuously collecting a high-resolution data of the component data and temporarily storing the high-resolution data;

an error diagnosis unit connected with the high-resolution data collecting unit, determining whether an error occurs based on the component data; and a timing unit, connected with the high-resolution data collecting unit;

wherein, the high-resolution data collecting unit is connected with the component storage unit, the error diagnosis unit is configured to trigger the high-resolution data collecting unit after the error occurs for the high-resolution data collecting unit to write the high-resolution data temporarily stored and continuously collected to the component storage unit, and the component communication unit is configured to perform a high-resolution data sending procedure to send the high-resolution data stored in the component storage unit with respect to a time point when the error occurs, a first time period before the error occurs and a second time period after the error occurs, to the bus, wherein the high-resolution data stored in the component storage unit includes a time information provided by the timing unit.

In one of the embodiments, the data collecting system of the present disclosure includes:

a component, arranged in the electric vehicle and connected with a bus of the electric vehicle, the component is configured to perform a regular data sending procedure, a high-speed data sending procedure, or a high-resolution data sending procedure, wherein the regular data sending procedure is performed to keep collecting a regular data of a component data of the electric vehicle and sending the regular data to the bus in accordance with a regular frequency, wherein the high-speed data sending procedure is performed to start collecting a high-speed data when satisfying at least one triggering condition and sending the high-speed data to the bus in accordance with a high-speed frequency that is higher than the regular frequency, wherein the high-resolution data sending procedure is performed to keep collecting and temporarily storing a high-resolution data of the component data, writing the high-resolution data with a time information that is temporarily stored and continuously collected after the error occurs, to a component storage unit when the error is determined to occur, and sending the high-resolution data stored in the component storage unit with respect to a time point when the error occurs, a first time period before the error occurs and a second time period after the error occurs, to the bus;

a data collector, connected to the bus to perform a full sampling procedure to bus data of the bus, wherein the data collector includes a time correction unit, a first communication unit, and a processing unit, the time correction unit is configured to connect to an NTP server to obtain a time information through the first communication unit, the processing unit is configured to associate the bus data with the time information to generate an uploading data, wherein the bus data includes at least one of the regular data, the high-speed data, and the high-resolution data; and a debug server, connected with the first communication unit of the data collector to receive the uploading data, wherein the debug server includes an error database and a diagnosis unit, the error database is configured to store multiple error patterns, the diagnosis unit is configured to compare the uploading data with the multiple error patterns and display a comparison result in real-time.

In one of the embodiments, the data collecting method of the present disclosure is incorporated with the data collecting system as disclosed above, and includes following steps:

a) continuously collecting, by the component, a regular data of a component data of the component, and performing a regular data sending procedure to send the regular data to the bus in accordance with a regular frequency;

b) determining, by the component, whether a triggering condition is satisfied based on the component data;

c) continuously collecting, by the component, a high-speed data of the component data after the component data is determined to satisfy the triggering condition, and performing a high-speed data sending procedure to send the high-speed data to the bus in accordance with a high-speed frequency, wherein the high-speed frequency is higher than the regular frequency;

d) continuously collecting, by the component, a high-resolution data of the component data, and temporarily storing the high-resolution data;

e) determining, by the component, whether an error occurs based on the component data;

f) storing, by the component, the high-resolution data temporarily stored and continuously collected, to a component storage unit, when the error occurs;

g) after the step f), performing, by the component, a high-resolution data sending procedure to send the high-resolution data stored in the component storage unit with respect to a time point when the error occurs, a first time period before the error occurs and a second time period after the error occurs, to the bus, wherein the high-resolution data includes a time information;

h) performing, by the data collector, a full sampling procedure to a bus data of the bus, wherein the bus data includes at least one of the regular data, the high-speed data, and the high-resolution data;

i) associating, by the data collector, the sampled bus data with a correct time to generate an uploading data;

j) receiving, by the debug server, the uploading data from the data collector; and k) comparing, by the debug server, the uploading data with multiple pre-stored error patterns and displaying a comparsion result immediately.

In comparison with related art, the present disclosure controls the component of the electric vehicle to send different data to the bus through different approaches under different circumstances, thus respectively transmit a low-speed data, a high-speed data, and a high-resolution data having an absolute time information, so as to optimize the loading of the bus. On the other hand, the present disclosure may flexibly set a triggering condition of a collecting action and a sending action of the data of the component. Therefore, the effective data useful for the engineer to analyze may be easily obtained. Also, the present disclosure uses the debug server to synchronously collect, analyze, and display the data from a remote end, so that the engineer may analyze the component data to find out the actual cause of the error immediately at the time the error occurs to the component.

Furthermore, the present disclosure allows the engineer to send a control command from a remote end to the data collector to modify a designated component after analysis accordingly. Therefore, the engineer may repair or resolve the error of the component of the electric vehicle directly from the remote end without going to the place where the electric vehicle exists.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

As described above, when testing an electric vehicle, the data collected and provided by a traditional car manufacturer is insufficient in resolution, lacks of time information, and the processing time for error analysis and error elimination is too long. Therefore, the engineer is hard to reproduce the error in the lab and have to go to the scene of the electric vehicle to analyze the error. In order to solve such problems, the present disclosure discloses a data collecting system for an electric vehicle.

Figure 1:
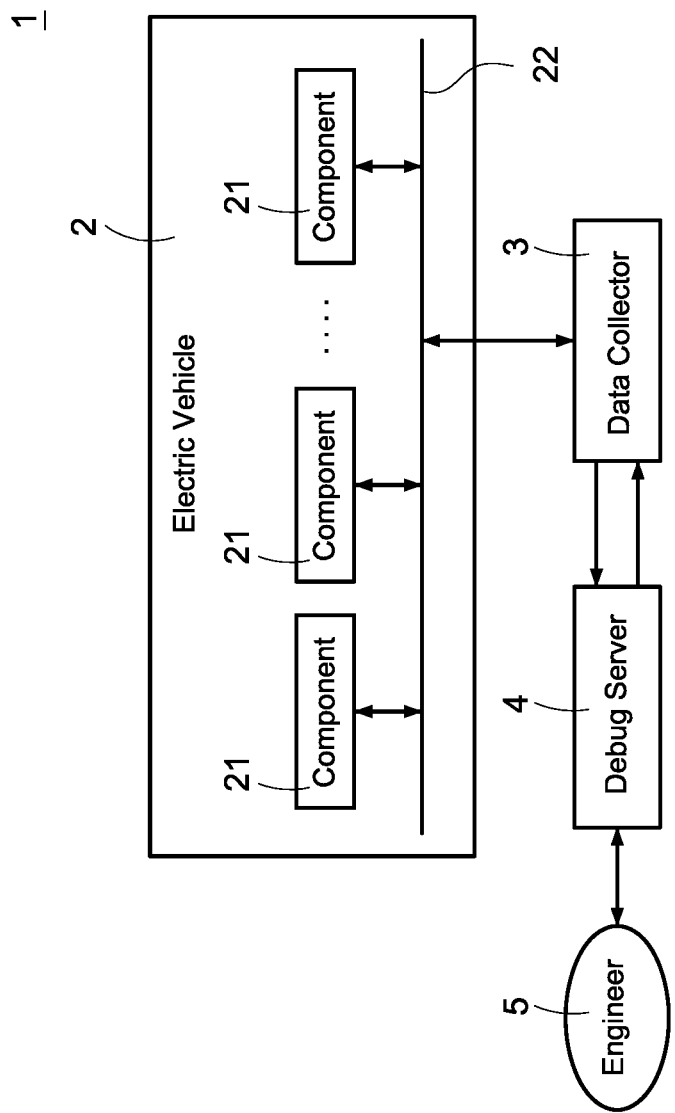
FIG. 1 is an embodiment of a block diagram of a data collecting system for an electric vehicle according to the present disclosure.

Please refer to FIG. 1. A collecting system of an electric vehicle (referred to as the collecting system 1 hereinafter) is disclosed, the collecting system 1 may be applied to different types of electric vehicles 2 including living transportation vehicles (such as electric cars, electric motorcycles, electric bicycles, etc.) and industrial vehicles (such as stackers). In particular, the collecting system 1 of the present disclosure may respectively collect and send different data of one or more components 21 of an electric vehicle 2 in accordance with different frequencies under different circumstances. By using the dynamic data collecting/sending procedure, an engineer may be assisted to obtain effective information immediately after an error occurs to the electric vehicle 2, so as to quickly and accurately analyze and reproduce the error, and then eliminate the error as soon as possible.

The collecting system 1 includes at least one component 21 arranged in the electric vehicle 2, a data collector 3 communicationally connected with the component 21 used to collect data that is outputted and sent from the component 21, and a debug server 4 communicationally connected with the data collector 3 used to collect data that is outputted and sent from the data collector 3. In one embodiment, the data collector 3 and the component 21 may be set at same position, such as an internal portion of the electric vehicle 2, and the debug server 4 may be set at a remote end, therefore an engineer 5 may directly check the data of the component 21 collected by the data collector 3 through the debug server 4.

The component 21 is arranged in the electric vehicle 2, and connected with a bus 22 of the electric vehicle 2. In one embodiment, the component 21 may be a motor, an inverter, a battery, or a dashboard of the electric vehicle 2. Otherwise, the component 21 may be an electric component that is applied with a modified firmware and sufficient for the requirement of the collecting system 1 of the present disclosure. The bus 22 may be, for example but not limited to, a bus using a controller area network (CAN) protocol (referred to as a CAN bus hereinafter). Each component 21 of the electric vehicle 2 may respectively send its component data to the bus 22, so that each of the components 21 connected to the bus 22 may perform a regular communication with each other through the bus 22. The data relevant to the regular communication is defined as a regular data of the component data as disclosed above. However, the above descriptions are only few embodiments of the present disclosure, but not limited thereto.

The data collector 3 may be a component having a processing unit. The data collector 3 is electrically coupled with the bus 22 of the electric vehicle 2, collects data of the component 21 and the electric vehicle 2 through an approach used to transmit an electric signal, and the data collector 3 may transmit a control command to the electric vehicle 2 (detailed described in the following).

The debug server 4 may communicationally connect with the data collector 3 through a wired manner or a wireless manner. In one embodiment, the debug server 4 is an electric equipment that may directly connect with the data collector 3 through a cable, a data transmitting line, a telephone line, or a network line, such as a personal computer (PC), an industrial PC (IPC), a laptop, a tablet, a smart phone, a rack server, etc., but not limited. In another embodiment, the debug server 4 is a remote server or a cloud server that may wirelessly connect with the data collector 3 through the Internet or a local area network (LAN), but not limited thereto.

In the present disclosure, the firmware of the component 21 is modified to perform a regular data sending procedure, a high-speed data sending procedure, and a high-resolution data sending procedure respectively under different circumstances. In each of the above procedures, the component 21 collects different data in accordance with different frequencies, and sends different data to the bus 22 of the electric vehicle 2 in accordance with different frequencies, thus implements a dynamic data sending procedure.

Generally speaking, after the electric vehicle 2 is activated, the component 21 may continuously sample the component data from the electric vehicle 2, so as to obtain each data essential to the component 21. It should be mentioned that the component data may be the data of the component 21 itself, or the data related to other components 21 of the electric vehicle 2. For example, an inverter may collect data related to the inverter itself from the electric vehicle 2, and it may also collect data related to a battery, where the inverter and the battery are two relevant components 21 of the electric vehicle 2.

When performing the regular data sending procedure, the component 21 continuously samples a pre-defined regular data from the component data in accordance with a regular frequency, and continuously sends the sampled regular data to the bus 22 in accordance with the regular frequency. In other words, when performing the regular data sending procedure, a sampling frequency used by the component 21 to sample the regular data is same as a sending frequency used by the component 21 to send the regular data. It should be mentioned that different components 21 may be needed to sample different regular data, for example, the regular data sampled by the inverter may be different from the regular data sampled by the battery, so that the regular frequency used by different components 21 may be different from each other. In one embodiment, the regular data indicates the data needed by each of the components 21 to perform a regular communication with each other, but not limited thereto.

When performing the high-speed data sending procedure, the component 21 keeps determining whether a preset triggering condition is satisfied or not based on the component data. When the triggering condition is satisfied, the component 21 starts sampling data that is pre-defined as a stay-for-collection data (referred to as a high-speed data hereinafter) from the component data in accordance with a high-speed frequency, and then sends the collected high-speed data to the bus 22 in accordance with the high-speed frequency. In one embodiment, the high-speed frequency is higher than the regular frequency, and both of the high-speed frequency and the regular frequency are lower than an upper limit of a transmitting ability of the bus 22.

In one embodiment, the component 21, before performing the high-speed data sending procedure, keeps collecting specific variables of the component data, comparing the specific variables with a default threshold recorded in the triggering condition, and determining whether the triggering condition is satisfied based on a comparison result. It should be mentioned that, in the embodiment, the component 21 does not collect the aforementioned high-speed data before the triggering condition is satisfied. Therefore, computing resources of the component 21 can be prevented from wasting, and the transmitting loading of the bus 22 can be reduced.

In the present disclosure, the component 21 may also keep collecting a data that has a high variation rate and is pre-defined as a high-resolution data from the component data, and temporarily storing the high-resolution data to a register (not shown) of the component 21 to wait for being sent. The above-mentioned high-resolution data of the present disclosure has the high variation rate, if the component 21 directly sends the high-resolution data to the bus 22 without the temporarily storing mechanism as mentioned above, the data amount being sent within an unit time may beyond the processing ability of the bus 22 and increase the loading of the bus 22. Therefore, the bandwidth of the bus 22 may be insufficient, turns out the communication among the components 21 may be failure.

Figure 2:
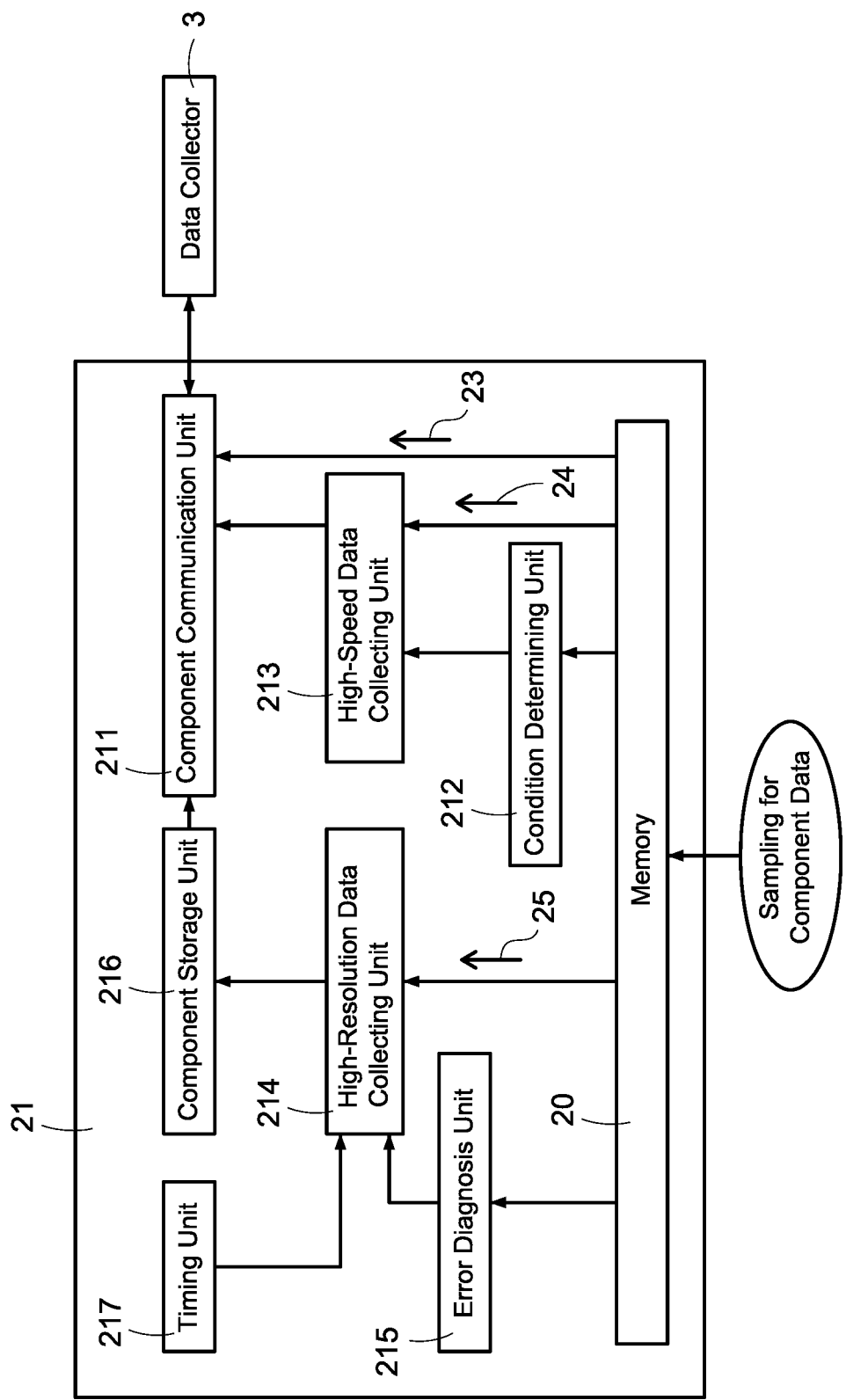
FIG. 2 is an embodiment of a block diagram of a component according to the present disclosure.

In the present disclosure, the component 21, when performing the high-resolution data sending procedure, keeps determining whether at least one pre-defined error occurs based on the component data, and writing all the high-resolution data temporarily stored in the register to a storage unit of the component 21 (such as a component storage unit 216 as shown in FIG. 2) immediately after the error occurs.

Besides, the component 21 keeps collecting the high-resolution data from the component data after the error occurs, and continuously writes the collected high-resolution data to the storage unit.

In the present disclosure, when the component 21 writes the high-resolution data to the register or the storage unit, the component 21 may simultaneously record a sampling time of sampling the high-resolution data. After the storage unit is written, the component 21 sends the high-resolution data accompanying with the sampling time of the high-resolution data stored in the storage unit to the bus 22.

As discussed, the high-resolution data indicates a part of data of the component data that has a high variation rate, this kind of data may provide a massive information in analyzing an actual cause that results in an error. However, in order to reduce the loading of the bus 22 and prevent the data from losing, the high-resolution data sending procedure of the present disclosure pre-collects the high-resolution data and stores the pre-collected high-resolution data to the register/storage unit. Because the time point of sending the high-resolution data is later than the time point of collecting the high-resolution data, a correct sampling time of sampling the high-resolution data has to be written in the register/storage unit, so as to maintain the referenceability of the collected high-resolution data, and maintain the reproducibility of the error.

By using the high-resolution data sending procedure as discussed above, the component 21 may send all the stored high-resolution data to the bus 22, wherein the high-resolution data are stored with respect to a time point that the error occurs, a first time period before the error occurs, and a second time period after the error occurs. The data amount of the high-resolution data is sufficient and recorded with a correct sampling time, so that the engineer 5 may reproduce the error that occurs within a specific time range in accordance with the high-resolution data in order to effectively analyze the cause of the error.

The data collector 3 is communicationally connected with the bus 22 of the electric vehicle 2, and performs a full sampling action to bus data of the bus 22, i.e., the data collector 3 collects all the bus data transmitted on the bus 22. The bus data indicates all the data respectively transmitted to the bus 22 from each of the components 21, including the regular data, the high-speed data, and the high-resolution data, but not limited thereto.

It should be mentioned that the bus 22 of the electric vehicle 2 of the present disclosure may be arranged with one or more connection ports, so that the bus 22 may be simultaneously connected with one or more data collectors 3. Therefore, the engineer 5 may perform different analyzing procedures based on different data respectively provided from different data collectors 3 according to different requirements.

Figure 4:
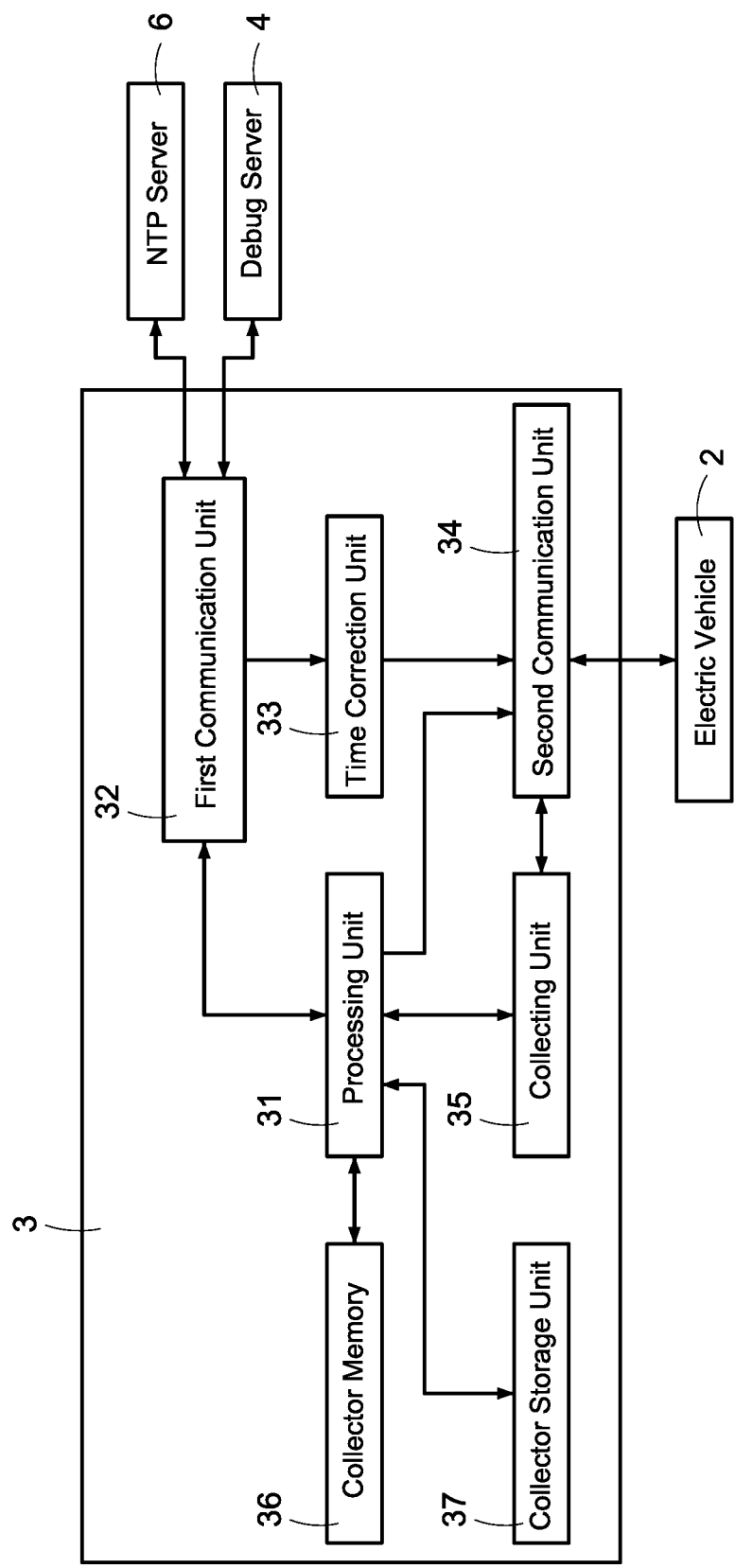
FIG. 4 is an embodiment of a block diagram of a data collector according to the present disclosure.

In one embodiment, the data collector 3 may obtain correct time information from an external server (such as an NTP server 6 as shown in FIG. 4), and associate the sampled bus data with the obtained time information to generate an uploading data with a format of a specific transmitting packet. In the present disclosure, the data collector 3 generates and sends out the uploading data immediately right after the bus data is collected.

Figure 6:
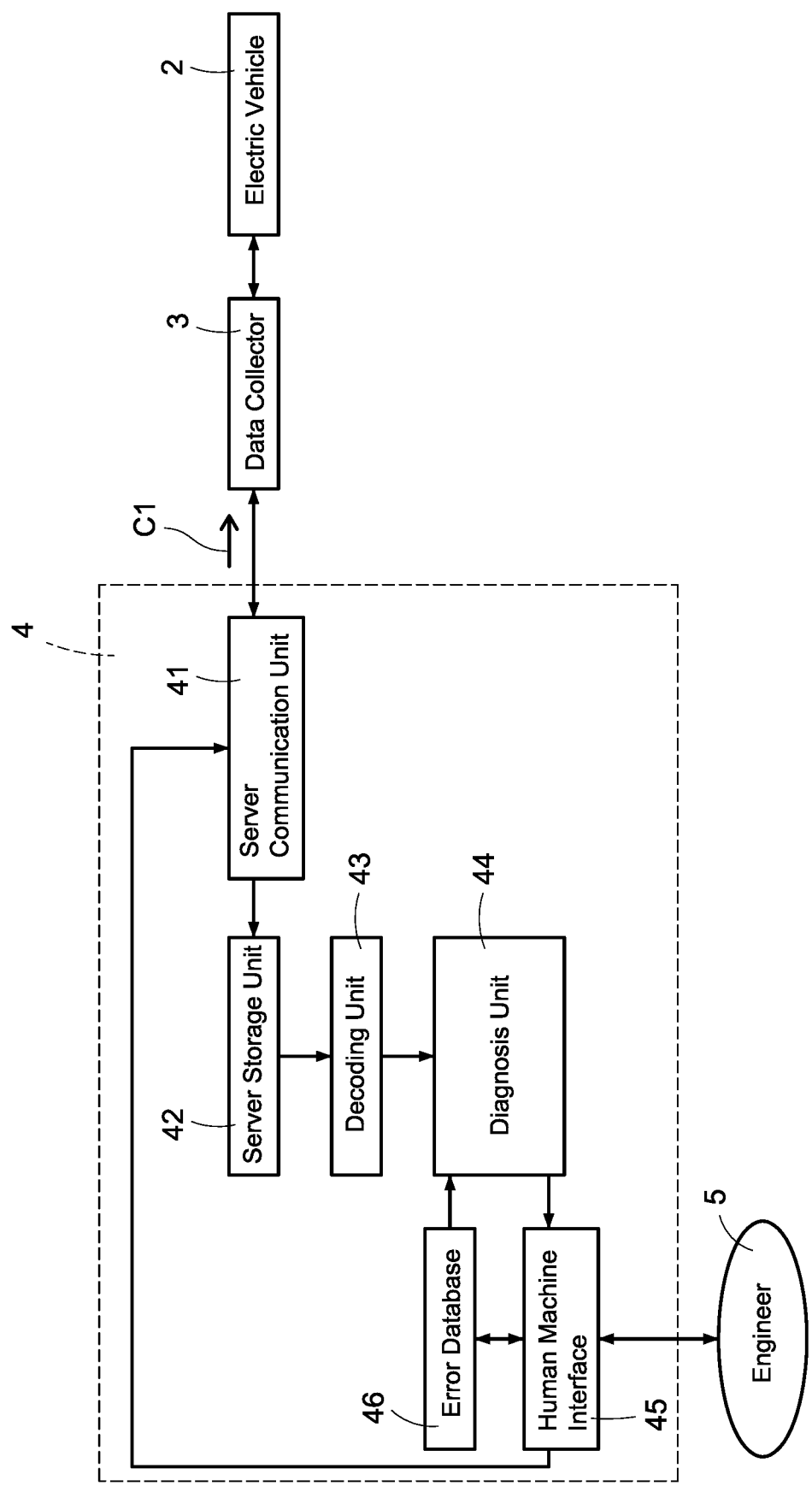
FIG. 6 is an embodiment of a block diagram of a debug server according to the present disclosure.

In one embodiment, the debug server 4 is connected with the data collector 3 through a wired manner or a wireless manner, and the debug server 4 receives the uploading data transmitted from the data collector 3. A database of the debug server 4 (such as an error database 46 as shown in FIG. 6) may store multiple pre-defined error patterns and multiple parameter ranges respectively corresponding to these error patterns. After receiving the uploading data, the debug server 4 may decode the uploading data to obtain an original physical value of the component 21. The debug server 4 compares the original physical value with the multiple error patterns, and displays a comparison result for the engineer 5 to check. The comparison result may indicate that, for example, an error occurs, no error occurs, impending an error, etc.

By using the collecting system 1 of the present disclosure, the engineer 5 may obtain, directly from the debug server 4, the original physical value information of the component 21, the possible error pattern of the error, the time point that the error occurred, and the high-resolution data with respect to the time point that the error occurs, the first time period before the error occurs, and the second time period after the error occurs. Therefore, the engineer 5 may easily reproduce the error in order to analyze the actual cause of the error, and may further repair the error directly from the remote end.

As discussed above, the collecting system 1 of the present disclosure is constituted mainly by the one or more components 21 inside the electric vehicle 2, the data collector 3 connected to the electric vehicle 2, and the debug server 4 connected with the data collector 3. The following description is provided with drawings to detailed discuss each portion of the collecting system 1.

Please refer to FIG. 2. The component 21 of the present disclosure is constituted by a hardware portion and a firmware portion. The hardware portion is similar to other components of a traditional electric vehicle, which may include a processor (not shown), a memory 20, a component communication unit 211, a component storage unit 216, and a timing unit 217. The firmware portion is recorded in the processor and executed by the processor. One technical feature of the present disclosure is that the firmware portion of the component 21 is customized to be logically divided into multiple firmware units and including a condition determining unit 212, a high-speed data collecting unit 213, a high-resolution data collecting unit 214, and an error diagnosis unit 215, and these units are divided based on execution functions of the firmware portion.

In the present disclosure, the component 21 keeps collecting a regular data 23 from the component data through the component communication unit 211 in accordance with a regular frequency. Under a first situation (such as a normal situation), the component 21 keeps performing the regular data sending procedure through the component communication unit 211 to send the regular data 23 to the bus 22 of the electric vehicle 2 in accordance with the regular frequency. The regular data 23 may be, for example, a bus communication protocol defined by a client-end (such as a KWP2000 protocol), a command for a specific function or mechanism (such as using or turning on/off a light) sent from an upstream controlling component to a downstream controlled component (such as an inverter controls a motor), an actual physical value of the component itself having a low variation rate or a data that may satisfy a determination requirement with a low sampling rate (such as a battery charge percentage, an error code, an instruction for switching on/off an inverter, a signal to indicate a peripheral component's status like "the kickstand is not stored", "the storage remains open", or a braking signal, etc.).

Under a second situation (such as a special situation), the component 21 may be set by a manufacturer or the engineer 5 to pre-define one or more stay-for-collection data (such as the high-speed data 24 being collected under the special situation), but the component 21 does not collect and send the high-speed data 24 through the component communication unit 211 at the moment. In one embodiment, the high-speed data 24 indicates a bus information (such as a battery voltage, a motor current, a motor voltage, etc.) provided for a predictive debugging requirement before an error occurs, data of the component 21 itself having a high variation rate, or data that may satisfy a determination requirement with a high sampling rate (such as a motor rotation-speed variation, an angle variation of an encoder, physical parameters related to protection purpose such as a current, a voltage, a torque, a temperature variation etc.).

In one embodiment, the component 21 keeps collecting component data through the condition determining unit 212 and determining whether the component data matches one or more triggering conditions preset by the condition determining unit 212. In particular, the condition determining unit 212 may be set by the manufacturer or the engineer 5 to pre-store one or more triggering conditions. When any of the triggering conditions is satisfied, it means that the component 21 may have a problem or may be confronted with an impending problem. Hence, when the condition determining unit 212 determines that at least one of the triggering conditions is satisfied based on the component data, the condition determining unit 212 sends an activating command to the high-speed data collecting unit 213.

In a real-world application, an inverter and a motor of an electric vehicle may be set with a corresponding temperature threshold, so that the temperatures of the inverter and the motor may be used to pre-determine an error. More specific, a threshold may be set to a negative temperature coefficient (NTC) signal. When a feedback value of the NTC signal is greater than the threshold, a collecting action for a specific physical value or parameter may be activated. Before the electric vehicle 2 occurs an error due to the abnormal temperature, it may collect the high-speed data 24 to pre-determine whether the electric vehicle 2 is confronted with an impending error. For example, a first temperature-warning threshold of an intelligent power module (IPM) may be set to 95° C., a second temperature-warning threshold of a motor may be set to 125° C., a third temperature-warning threshold of a capacitance may be set to 120° C. When the component temperature exceeds each of the above temperature-warning thresholds, a corresponding error code does not be released immediately, instead, it indicates that the temperature of the component 21 is too high and an error is impending to occur. In the embodiment, the collecting action for the high-speed data 24 may be used to assist the determination to find out a possible cause to the error and to further prevent the same.

The high-speed data collecting unit 213 is connected with the condition determining unit 212 and the component communication unit 211. After receiving the activated command, the high-speed data collecting unit 213 reads the content of the activated command and starts to collect the high-speed data 24 indicated by the content of the activated command in accordance with the high-speed frequency. In the embodiment, the component communication unit 211 starts to execute the high-speed data sending procedure after the high-speed data collecting unit 213 starts to collect the indicated high-speed data 24, so as to send the collected high-speed data 24 to the bus 22 in accordance with the high-speed frequency, wherein the high-speed frequency is higher than the regular frequency used in the regular data sending procedure.

Under a third situation (such as a malfunction situation), the component 21 may pre-collect a pre-defined specific data (i.e., the high-resolution data 25) from the component data through the high-resolution data collecting unit 214, and temporarily store the collected high-resolution data 25 to an internal register (not shown) of the component 21. In one embodiment, the high-resolution data collecting unit 214 writes the high-resolution data 25 to the register by using a first in first out (FIFO) approach. When the register is written to be full of capacity, the high-resolution data collecting unit 214 deletes oldest data in the register to maintain the applicability of the stored data.

More specific, the high-resolution data 25 includes a bus data (such as an over-current data, an over-voltage data, etc.) defined based on a debugging requirement needed when an error occurs, an actual physical value of the component 21 itself having an extremely high variation rate, or data that may only satisfy a determination requirement when being sampled with an extremely high sampling rate (such as Id, Iq, a torque command, etc.).

The error diagnosis unit 215 is connected with the high-resolution data collecting unit 214, the component storage unit 216 is connected with the high-resolution data collecting unit 214 and the component communication unit 211, and the timing unit 217 is connected with the high-resolution data collecting unit 214.

In the embodiment, the component 21 keeps collecting the component data through the error diagnosis unit 215 and determining whether one or more pre-defined errors occur or not based on the component data. When the error diagnosis unit 215 determines that an error occurs, the error diagnosis unit 215 sends an activated command to the high-resolution data collecting unit 214. After receiving the activated command, the high-resolution data collecting unit 214 stores all the high-resolution data 25 temporarily stored in the register to the component storage unit 216. Also, the high-resolution data collecting unit 214 keeps collecting the high-resolution data 25 after the error occurs, and synchronously stores the collected high-resolution data 25 to the component storage unit 216 when the error occurs.

In a real-world application, a first temperature-error threshold of the IPM may be set to 100° C., a second temperature-error threshold of the motor may be set to 130° C., and a third temperature-error threshold of the capacitor may be set to 125° C. The temperature-error thresholds are higher than the aforementioned temperature-warning thresholds respectively. When the temperature of the components keeps raising and exceeds each of the temperature-error thresholds, the system may release a corresponding error code such as OH1, OH2, OH3, etc. By referring to the error code, a person relevant to the system, may understand that which of the components is confronted with the error. Besides, by referring to the high-resolution data 25 collected with respect to the time point that the error occurs, the first time period before the error occurs, and the second time period after the error occurs, the actual cause that results in the error or the overheat status to the component may be determined.

An example that determines whether an error of over-current occurs to an inverter of an electric vehicle is disclosed. In the embodiment, an error threshold of the current of the inverter may be set to 212 A-RMS, where A represents ampere, RMS represents root mean square. The factors related to an error of over-current are the information having a high frequency variation, so that the collection action of the high-resolution data 25 is needed to obtain more effective information. When a current value of a motor is detected to exceed a corresponding error threshold, the system may release an error code of OCN. By referring to the error code (i.e., OCN), the system may determine that an error of over-current occurs. Therefore, an actual cause that results in the error of over-current, such as a wrong operating step or a failed component, may be determined based on the high-resolution data 25 collected with respect to the time point when the error occurs, the first time period before the error occurs, and the second time period after the error occurs.

When the component storage unit 216 reaches a specific threshold (for example, when the component storage unit 216 is written to be full of capacity), the component 21 performs the high-resolution data sending procedure through the component communication unit 211, so as to send all the high-resolution data 25 stored in the component storage unit 216 at the very time to the bus 22. By pre-collecting the data, temporarily storing the data, storing the data, and postponing to send the data after the error occurs, the high-resolution data 25 sent from the component communication unit 211 to the bus 22 includes full detailed data that is stored at the time point when the error occurs, during the first time period before the error occurs, and during the second time period after the error occurs.

More specific, the high-resolution data 25 in the present disclosure indicates the data having a data variation rate higher than an upper limit of the transmitting ability of the bus 22. If the high-resolution data 25 is sent to the bus 22 through the aforementioned regular sending procedure, the high-resolution data 25 may be partly lost and the resolution of the data may be reduced due to the insufficient sampling frequency being used before performing the regular sending procedure. In order to solve the problem, the present disclosure fully collects the high-resolution data 25 by using a data pre-collecting approach and a data temporarily storing approach as discussed above, and only sends a certain part of high-resolution data 25 that are stored at the time point when the error occurs, during the first time period before the error occurs, and during the second time period after the error occurs, to the bus 22. It can be understood that the time point of sending the high-resolution data 25 is later than the time point of collecting the same, so a time information is really important to the high-resolution data 25.

The timing unit 217 of the component 21 may obtain a correct time information through the electric vehicle 2, the data collector 3, or other sources. When the high-resolution data collecting unit 214 writes the high-resolution data 25 to the register and/or the component storage unit 216, a correct time information may be written at the same time. Therefore, the high-resolution data 25 sent on the bus 22 may include the time information correspondingly, so as to assist the engineer 5 to aware the actual occurring time of the error, hence the determination made by the engineer 5 may be more accurate.

The component 21 further includes a memory 20 connected with the component communication unit 211, the condition determining unit 212, the high-speed data collecting unit 213, the high-resolution data collecting unit 214, and the error diagnosis unit 215. In the present disclosure, the component 21 performs a full sampling action to the component data of the electric vehicle 2 in accordance with an ultrahigh-speed frequency and stores the sampled component data in the memory 20, wherein the ultrahigh-speed frequency is way higher than the regular frequency and the high-speed frequency as discussed above. It should be mentioned that the ultrahigh-speed frequency is much higher than the upper limit of the transmitting ability of the bus 22. As a result, no matter which procedure of the regular data sending procedure, the high-speed data sending procedure, or the high-resolution data sending procedure is performed by the component 21, the data stored in the memory 20 may satisfy the collecting requirements and the sending requirements of the component 21.

The memory 20 stores all the component data that is relevant to the component 21. In one embodiment, the component communication unit 211 may collect the regular data 23 of the component data from the memory 20, the condition determining unit 212 may collect the component data from the memory 20 to determine whether the triggering condition is satisfied, the high-speed data collecting unit 213 may collect the high-speed data 24 of the component data from the memory 20, the high-resolution data collecting unit 214 may collect the high-resolution data 25 of the component data from the memory 20, the error diagnosis unit 215 may collect the component data from the memory 20 to determine whether an error occurs.

For an example, the condition determining unit 212 may collect a first variable of the component data from the memory 20. When the first variable reaches a preset threshold, the condition determining unit 212 determines that the component data satisfies one of the triggering conditions and activates the high-speed data sending procedure. For example, if the first variable is the motor temperature, and the motor temperature exceeds a temperature-warning threshold which is 125° C., the condition determining unit 212 may determine that the motor temperature at the very time satisfies one of the triggering conditions and then activate the high-speed data sending procedure.

For another example, the error diagnosis unit 215 may collect the component data from the memory 20, compare a second variable of the collected component data with multiple preset error parameters, determine whether an error occurs or not due to a comparison result, and activate the high-resolution data sending procedure when determines that an error occurs. For example, when the motor temperature keeps raising and exceeds the temperature-error threshold which is 130° C., the error diagnosis unit 215 releases an error code of OH2, and uses the error code to be the second variable to compare with multiple error parameters (such as OH1, OH2, OH3, etc.), and uses the comparison result to determine that an error occurs to the component 21 because the motor temperature is too high. For another example, when the current of the inverter exceeds the error threshold which is 212 A-RMS, the error diagnosis unit 215 releases an error code of OCN, and uses the error code to be the second variable to compare with multiple error parameters (such as OVN, OCN, etc.), and uses the comparison result to determine that an error occurs to the component 21 because the over-current. However, the above description is only one of the exemplary embodiments of the present disclosure, but not limited thereto.

Figure 3A:
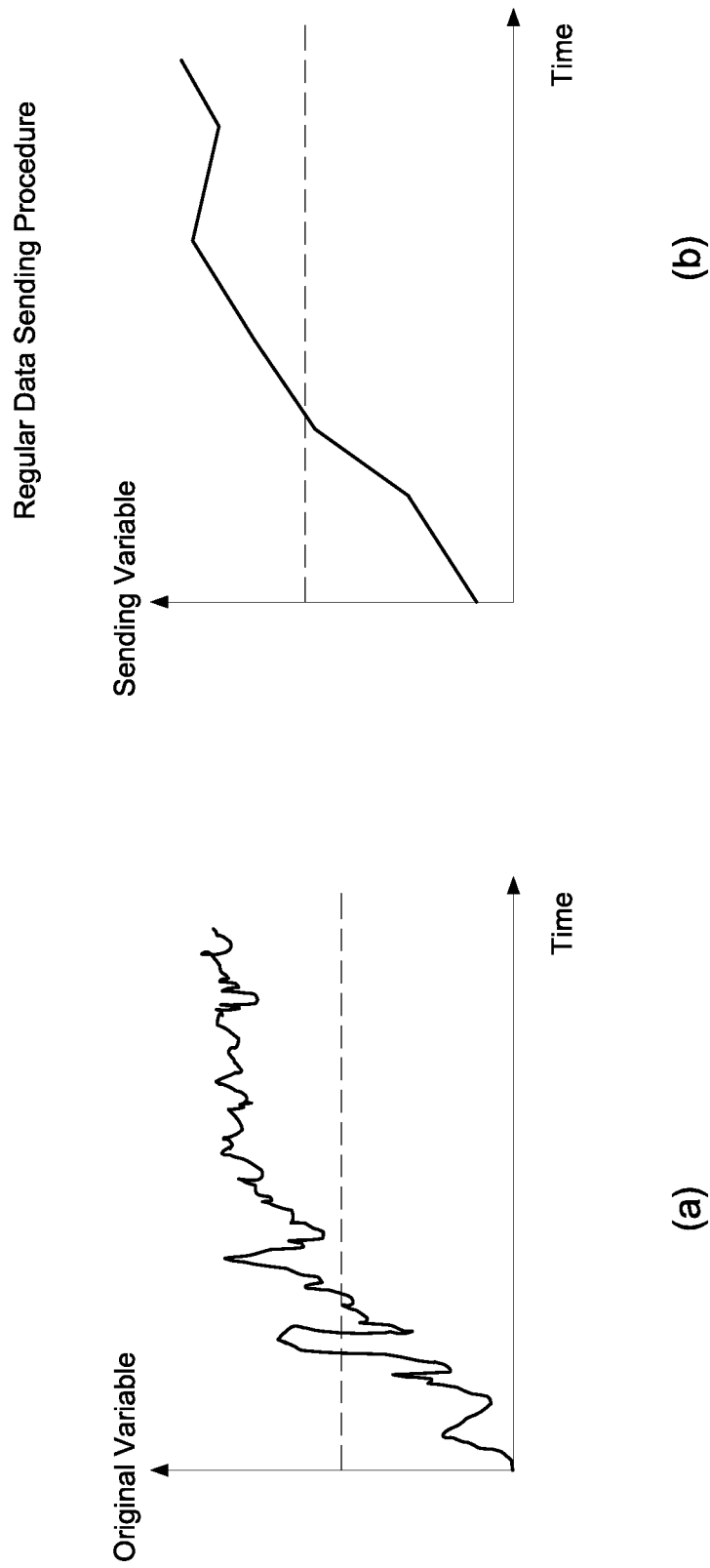
FIG. 3A is an embodiment of a schematic diagram showing a first data variation rate according to the present disclosure.
Figure 3B:
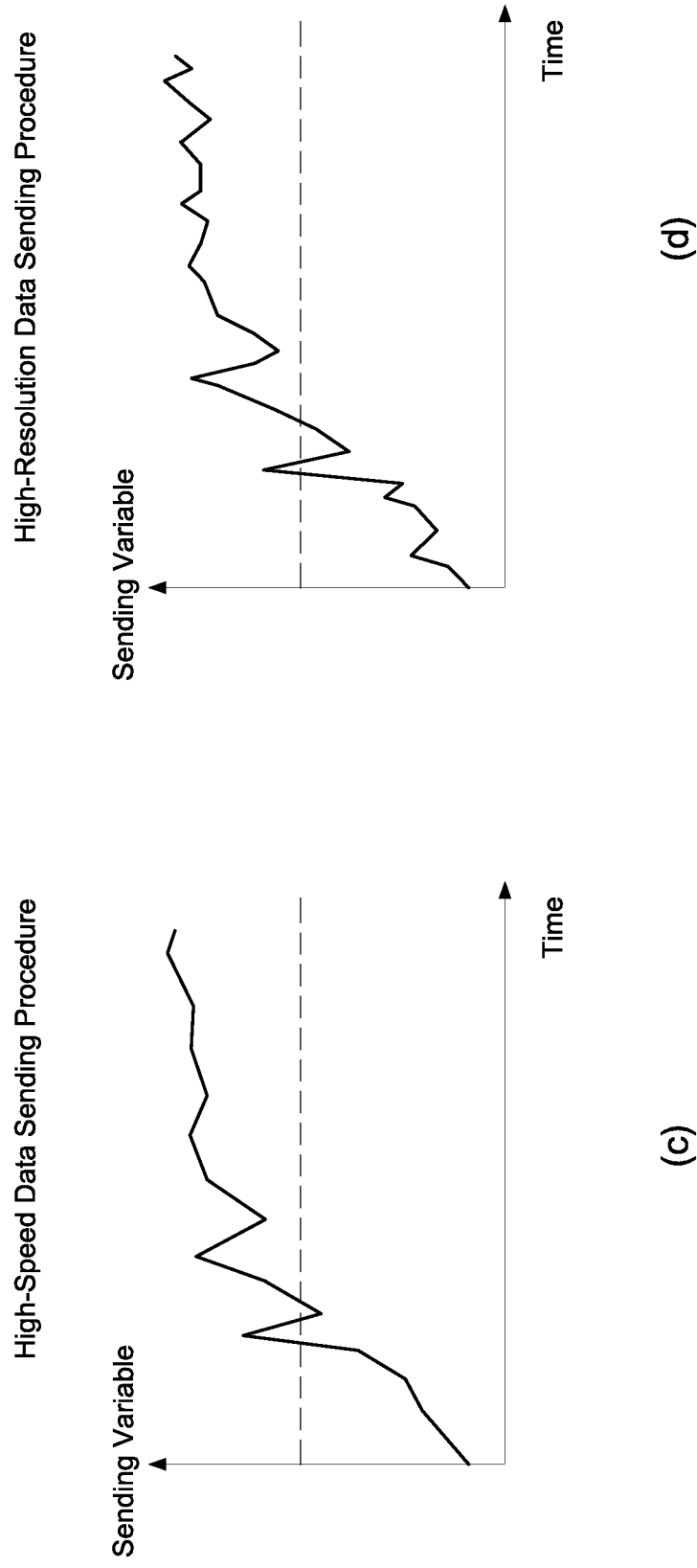
FIG. 3B is an embodiment of a schematic diagram showing a second data variation rate according to the present disclosure.

Please refer to FIG. 3A and FIG. 3B at the same time, wherein a schematic diagram (a) of FIG. 3A shows a time-related trend of an original variable of the component 21, a schematic diagram (b) of FIG. 3A shows a time-related trend of a sending variable of the regular data sending procedure, a schematic diagram (c) of FIG. 3B shows a time-related trend of a sending variable of the high-speed data sending procedure, and a schematic diagram (d) of FIG. 3B shows a time-related trend of a sending variable of the high-resolution data sending procedure.

As shown in the schematic diagram (b) of FIG. 3A, a sampling period of the regular data 23 sent by the regular data sending procedure is about 100 ms, which may only show a data trend. As shown in the schematic diagram (c) of FIG. 3B, a sampling period of the high-speed data 24 sent by the high-speed data sending procedure is about 1 ms, which may show more detailed information in comparison with the curve of the regular data 23. As shown in the schematic diagram (d) of FIG. 3B, a sampling period of the high-resolution data 25 sent by the high-resolution data sending procedure is about 200 μs, which may show more subtle changes in comparison with the curve of the high-speed data 24. The present disclosure samples different data having different variation rates in accordance with different sampling periods due to different requirements, so that the work load of the bus 22 in sending the data may be reduced, and the requirement of the engineer 5 in determining the actual cause that results in the error may also be satisfied.

As shown in the schematic diagram (a) of FIG. 3A, the sampling rate used by the component 21 to sample the original variable (i.e., the frequency used by the memory 20 to collect the component data from the electric vehicle 2) is extremely greater than the frequencies used by the regular data sending procedure, the high-speed data sending procedure, and the high-resolution data sending procedure. Therefore, no matter what frequency is used by the regular data sending procedure, the high-speed data sending procedure, and the high-resolution data sending procedure, the memory 20 may satisfy all the requirement of the component 21. As a result, the present disclosure may assist the component 21 to achieve the purpose of performing the dynamic data sending mechanism.

Please refer to FIG. 4. FIG. 4 shows that the data collector 3 of the present disclosure includes a processing unit 31, a first communication unit 32, a time correction unit 33, a second communication unit 34, a collecting unit 35, a collector memory 36, and a collector storage unit 37.

The processing unit 31 may be a processor, a micro control unit (MCU), a system on chip (SoC), or a programmable logic controller (PLC). The first communication unit 32 and the second communication unit 34 may be integrated together or remain two individual units, and the two communication units 32, 34 may be wired communication units (such as bus connectors) or wireless communication units (such as transmitting modules using a Wi-Fi communication protocol, a Bluetooth communication protocol, a radio frequency (RF) communication protocol, or a ZigBee communication protocol), but not limited thereto.

In one embodiment, the data collector 3 is connected with an external network time protocol (NTP) server 6 and the debug server 4 through the first communication unit 32 and connected with the bus 22 of the electric vehicle 2 through the second communication unit 34. The time correction unit 33 is connected to the first communication unit 32 and the second communication unit 34. In the embodiment, the time correction unit 33 may obtain a correct time information from the NTP server 6 through the first communication unit 32 after the data collector 3 is activated. Also, the time correction unit 33 sends the time information to one or more components 21 of the electric vehicle 2 through the second communication unit 34. Therefore, each of the components 21 may maintain its own time accuracy through an internal timing mechanism (such as the timing unit 217 shown in FIG. 2) based on the time information obtained from the data collector 3, so that the multiple components 21 of the electric vehicle 2 may keep time consistence.

The processing unit 31 is connected with the first communication unit 32, the second communication unit 34, the collecting unit 35, the collector memory 36, and the collector storage unit 37, and the collecting unit 35 is connected with the second communication unit 34. In one embodiment, the collecting unit 35 performs a full sampling action to the bus data of the bus 22 of the electric vehicle 2 through the second communication unit 34, and the collecting unit 35 temporarily stores the sampled bus data to the collector memory 36 through the processing unit 31. In this embodiment, the data collector 3 performs the full sampling action to the data of the bus 22, so that the obtained bus data may fully include the regular data 23, the high-speed data 24, and the high-resolution data 25 that are respectively sent from different components 21 of the electric vehicle 2 to the bus 22 in accordance with different procedures.

The processing unit 31 associates the bus data stored in the collector memory 36 with the obtain time information to generate an uploading data that is attached with a time label and has a specific transmitting format, and the processing unit 31 transmits the uploading data to the debug server 4 through the first communication unit 32.

It should be mentioned that, for the engineer 5 to synchronously obtain the information relevant to the electric vehicle 2 from the debug server 4, in a regular embodiment, the data collector 3 may send the uploading data to the debug server 4 through the first communication unit 32 immediately after sampling. However, if a problem occurs to a transmitting route between the data collector 3 and the debug server 4, such as a bad network quality or a damaged connection line, the processing unit 31 may temporarily stores the uploading data to the collector storage unit 37. After such problem is resolved, such as the network quality is recovered or the damaged connection line is changed, the processing unit 31 reads out the uploading data from the collector storage unit 37, and then sends the uploading data to the debug server 4 through the first communication unit 32. It should be mentioned that the collector memory 36 and the collector storage unit 37 may be integrated into a single module.

It should be mentioned that, though the component 21 of the present disclosure may be arranged with the timing unit 217 as shown in FIG. 2, however, due to design considerations of the electric vehicle 2 itself, the timing unit 217 may not be implemented by a real-time clock (RTC) timer that may keep operating even after the electric vehicle 2 or the component 21 is powered off. In this scenario, the collecting system 1 of the present disclosure uses the time correction unit 33 of the data collector 3 to provide a correct time information to the component 21.

Figure 5:
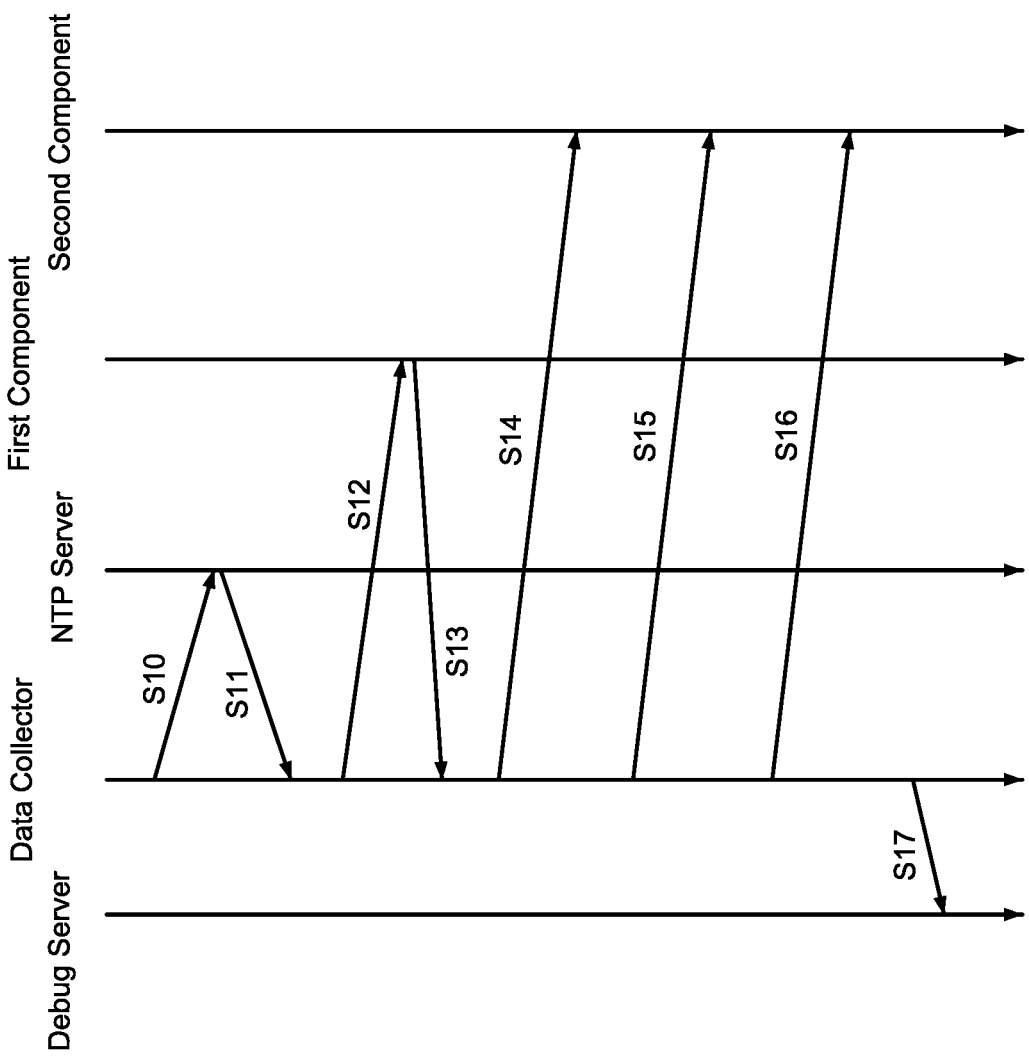
FIG. 5 is an embodiment of a schematic diagram showing a time sequence according to the present disclosure.

Please refer to FIG. 5. FIG. 5 takes an electric vehicle 2 including two components (including a first component and a second component) as an example to discuss, but the amount of the component 21 of the present disclosure is not limited to two.

First, the data collector 3 sends a request for the time information to the NTP server 6 through the first communication unit 32 (step S10). After receiving the request, the NTP server 6 immediately transmits a standard time to the data collector 3 (step S11). Then, the data collector 3 sets the standard time to be a system time of the data collector 3 through the time correction unit 33.

After the system time is set completely, the data collector 3 performs a time setting procedure to set the time to each of the components 21 connected to the bus 22 one by one. In particular, the data collector 3 sends the system time to a first component through the second communication unit 34 (step S12). After receiving the system time, the first component finishes an internal time setting procedure through its timing unit 217 and transmits the set time back to the data collector 3 for confirmation (step S13).

After the first component is set completely, the data collector 3 next sends the system time to a second component through the second communication unit 34 (step S14).

If the data collector 3 does not receive a feedback from the second component in a certain time period (such as 1 second) after the system time is sent, or the second component sends back a wrong time, the data collector 3 re-sends the system time to the second component (step S15). In one embodiment, the data collector 3 may determine that the second component is abnormal after re-sending the system time to the second component for another two checks (i.e., the step S15 and step S16 are executed) and does not receive any response or receives a wrong time.

When determining that the second component is abnormal, the data collector 3 sends an abnormal report to the debug server 4 through the first communication unit 32, so as to report to the debug server 4 that the time setting procedure of the second component is abnormal (step S17).

However, the above description is only one of the exemplary embodiments of the present disclosure, the data collector 3 may perform the time setting procedure to the component 21 of the electric vehicle 2 through different manners, not limited to the setting approach shown in FIG. 5.

Please refer to FIG. 6, the debug server 4 of the present disclosure is an electric device constituted by hardware and firmware, such as a personal computer (PC), a laptop computer, a tablet, a smart phone, an industrial PC (IPC), a rack server, etc. The hardware of the debug server 4 is similar to the hardware of a traditional electric device. In particular, the debug server 4 includes a processing unit (not shown), a server communication unit 41, a server storage unit 42, a human-machine interface 45, and an error database 46. The firmware is stored and executed by the processing unit. In the present disclosure, the firmware of the debug server 4 is customized to be logically divided into multiple units including a decoding unit 43 and a diagnosis unit 44 according to its executable function, but not limited thereto.

The processing unit may be, for example, a processor, a micro control unit (MCU), a system on chip (SoC), or a programmable logic controller (PLC). The processing unit is used to execute the firmware in order to perform the functions corresponding to the decoding unit 43 and the diagnosis unit 44. The server communication unit 41 may be a wired communication unit (such as a connector) or a wireless communication unit (such as a transmitting module applying a Wi-Fi communication protocol, a Bluetooth communication protocol, a radio frequency communication protocol, or a ZigBee communication protocol). The error database 46 may be a storage inside of the debug server 4. The human machine interface 45 may be an interactive equipment such as a keyboard, a mouse, a display, a touch screen, or the combination arranged on the debug server 4 that may be interacted with a user. However, the above description is only one of the exemplary embodiments of the present disclosure, but not limited thereto.

In the present disclosure, the debug server 4 is communicationally connected with the data collector 3 through the server communication unit 41, so as to receive the uploading data sent from the data collector 3. The server storage unit 42 is connected with the server communication unit 41, used to store the uploading data received by the server communication unit 41.

The decoding unit 43 is connected with the server storage unit 42, used to decode the stored uploading data into the actual physical values of each component 21 of the electric vehicle 2, the actual physical values such as output voltage, output current, battery level, motor rotating angle, etc., but not limited thereto. It should be mentioned that the uploading data is carrying with a time label, so that the actual physical values restored and decoded by the decoding unit 43 may effectively represent the actual information of each component 21 at each time point.

The diagnosis unit 44 is connected with the decoding unit 43, the human machine interface 45 and the error database 46, wherein the error database 46 records one or more error patterns pre-defined by car manufacture or the engineer 5, each of the error patterns may be, for example, a relationship of a specific error code and a specific physical value. For example, the error pattern may be: "A first pattern shows that the output voltage of the battery being smaller than a first threshold is corresponding to a first error code representing an abnormal voltage", "A second pattern shows that the input current of the inverter being greater than a second threshold is corresponding to a second error code representing an abnormal current", etc., but not limited thereto.

The specific error code, the specific physical value, and the threshold may be defined by developers of each of the components 21 after experiments, and the specific error code, the specific physical value, and the threshold are recorded in the error database 46. If the developers (could be the engineer 5) consider to modify the definition, the information or the value to increase the quality and the accuracy of the analyzing result of the diagnosis unit 44, the developers may operate the debug server 4 through the human machine interface 45, so as to edit the error database 46 to create, delete or update the one or more error patterns recorded in the error database 46.

After receiving the actual physical values decoded by the decoding unit 43 and comparing the actual physical value with the one or more error patterns in the error database 46, the diagnosis unit 44 generates a comparison result to represent an initial analyzing result, such as "an error occurs", "no error occurs", or "an error is impending to occur", etc.

It should be mentioned that the electric vehicle 2 may be arranged with multiple components 21, and each of the components 21 may be affected with each other. Sometime a component A is suspected to be malfunction, but actually the malfunction is caused by a problem from a component B. In one embodiment, the data collector 3 may collect the data of multiple components 21 from the bus 22 at the same time, and synchronously send these data to the debug server 4. In this embodiment, the diagnosis unit 44 may perform a simultaneous analysis in accordance with a combination of multiple data related to different components 21, so as to determine the possible cause that results in the error more precisely.

In one embodiment, the debug server 4 may display the information related to each component 21 of the electric vehicle 2 (i.e., the actual physical values) directly through the human machine interface 45, and also display the initial analyzing result generated by the diagnosis unit 44. Therefore, the engineer 5 may obtain all the data essential for reproducing the error and analyzing the actual cause of the error directly from the human machine interface 45 of the debug server 4. Also, by synchronously displaying the initial analyzing result generated by the diagnosis unit 44, the present disclosure may assist the engineer 5 to determine the actual cause of the error more easily and quickly.

In the present disclosure, the aforementioned actions including sending the regular data 23, the high-speed data 24, and the high-resolution data 25 from each component 21 to the bus 22, and then displaying the actual physical values and the comparison result by the debug server 4 through the human machine interface 45, may be completed within few seconds. Therefore, the traditional problem that the engineer 5 is hard to reproduce the error based on the obtained data and has to go to the place of the electric vehicle 2 to debug and repair the electric vehicle 2, may be effectively prevented.

It should be mentioned that, in one embodiment, the human machine interface 45 may be directly connected with the server communication unit 41. In particular, when the engineer 5 needs to check the related data of each component 21 through the human machine interface 45, or the engineer 5 considers that the related data needs to be modified or added, the engineer 5 is allowed to directly operate the human machine interface 45 to make the debug server 4 to generate a corresponding control command C1, and the debug server 4 sends the control command C1 to the data collector 3 through the server communication unit 41.

In one embodiment, the control command C1 records a to-be-modified content and an ID of one of the components 21 that the engineer 5 wants to modify. After receiving the control command C1, the data collector 3 may modify a corresponding one of the components 21 connected to the bus 22 in accordance with the content of the control command C1. In one embodiment, the to-be-modified content recorded in the control command C1 may be, for example, modifying the content of the regular data 23, the high-speed data 24, or the high-resolution data 25 sent by the corresponding component 21, modifying a data sampling frequency or a data sending frequency of the corresponding component 21, modifying the triggering condition of the high-speed data sending procedure, modifying the error parameters used to determine whether an error occurs, updating the firmware of the corresponding component 21, etc., but not limited thereto. The modifying procedures mentioned above may be called an over-the-air (OTA) programming. By reversely sending the control command C1 from the debug server 4 to the data collector 3, the collecting system 1 of the present disclosure may allow the engineer 5 to work at a remote end and simulate a working scenario that the engineer 5 is personally going to the place of the electric vehicle 2 to debug and repair the electric vehicle 2.

Figure 7A:
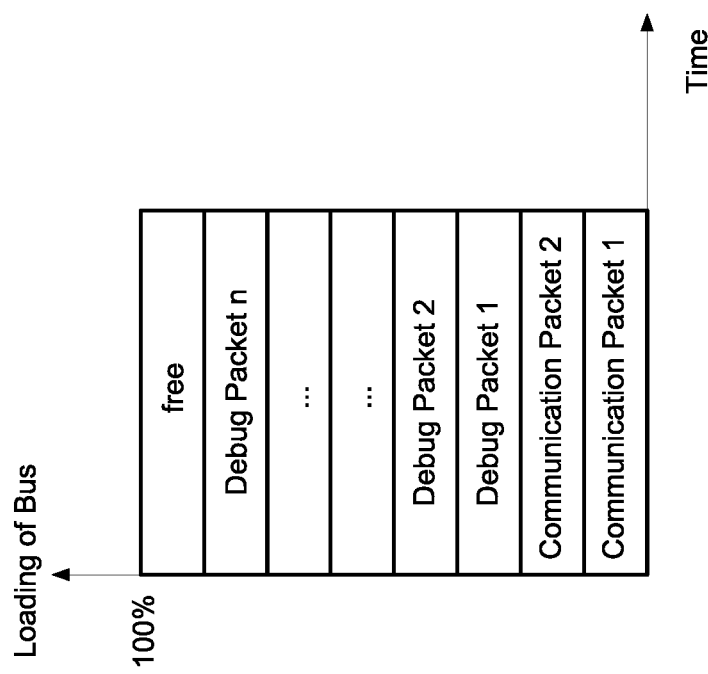
FIG. 7A is a schematic diagram showing a regular data packet.

Please refer to FIG. 7A. The data collecting approach used by traditional components of a traditional electric vehicle is to send all the data to the bus no matter an error is occurring or not. In doing so, in addition to basic communication packets of each component (which are similar to the regular data 23 of the present disclosure), each of the components needs to add a lot of debug packets in the data packets. Therefore, the bandwidth of the bus may be stuffed by the data continuously sent by each of the components, turns out the loading of the bus is extremely high and cannot be reduced.

Because the loading of the bus is extremely high, even if the traditional electric vehicle uses an additional data collector to collect the data from the bus, the data collector cannot perform a full sampling procedure to the bus. Instead, the data collector needs to perform a partial sampling procedure or a compression procedure in order to reduce the total data amount. Therefore, the engineer at the remote end may only obtain a reduced data (which is called a low-resolution data) from the data collector, turns out the engineer is hard to reproduce the error and analyze the actual cause of the error in according to the obtained data.

In the collecting system 1 of the present disclosure, each of the components 21 regularly sends a basic communication packet (i.e., the regular data 23) which is needed for communication to the bus 22, and each of the components 21 sends the high-speed data 24 in accordance with the high-speed frequency or sends the high-resolution data 25 in accordance with a specific frequency, in company with an essential debug packet, when and only when a default triggering condition is satisfied (which is determined by the condition determining unit 212) or an error occurs (which is determined by the error diagnosis unit 215). When a stopping condition is satisfied (i.e., the triggering condition is no longer satisfied or the error is eliminated), the component 21 stops sending the high-speed data 24 and/or the high-resolution data 25. Therefore, the collecting system 1 of the present disclosure may extremely reduce the amount of the debug packet transmitted through the bus 22, so that the loading of the bus 22 may be reduced. In comparison with related art, the data collector 3 of the present disclosure may obtain the bus data from the bus 22 that has information with a higher resolution.

Figure 7B:
FIG. 7B is a schematic diagram showing a data packet according to the present disclosure.

Please refer to FIG. 7B. The collecting system 1 of the present disclosure extremely reduces the loading of the bus 22, therefore, the loading of the data collector 3 does not increase even if the data collector 3 performs the full sampling procedure to the bus 22. As a result, the resolution and the effectiveness of the collected data may be increased, so that the debug server 4 and the engineer 5 may be assisted by the collected data to analyze the actual cause of the error more easily and effectively.

The present disclosure further discloses a data collecting method for the electric vehicle 2 (referred to as the collecting method hereinafter), the collecting method is incorporated with the collecting system 1 as shown in FIG. 1, and is implemented by the component 21, the data collector 3, and the debug server 4 as respectively shown in FIG. 2, FIG. 4, and FIG. 6.

Figure 8:
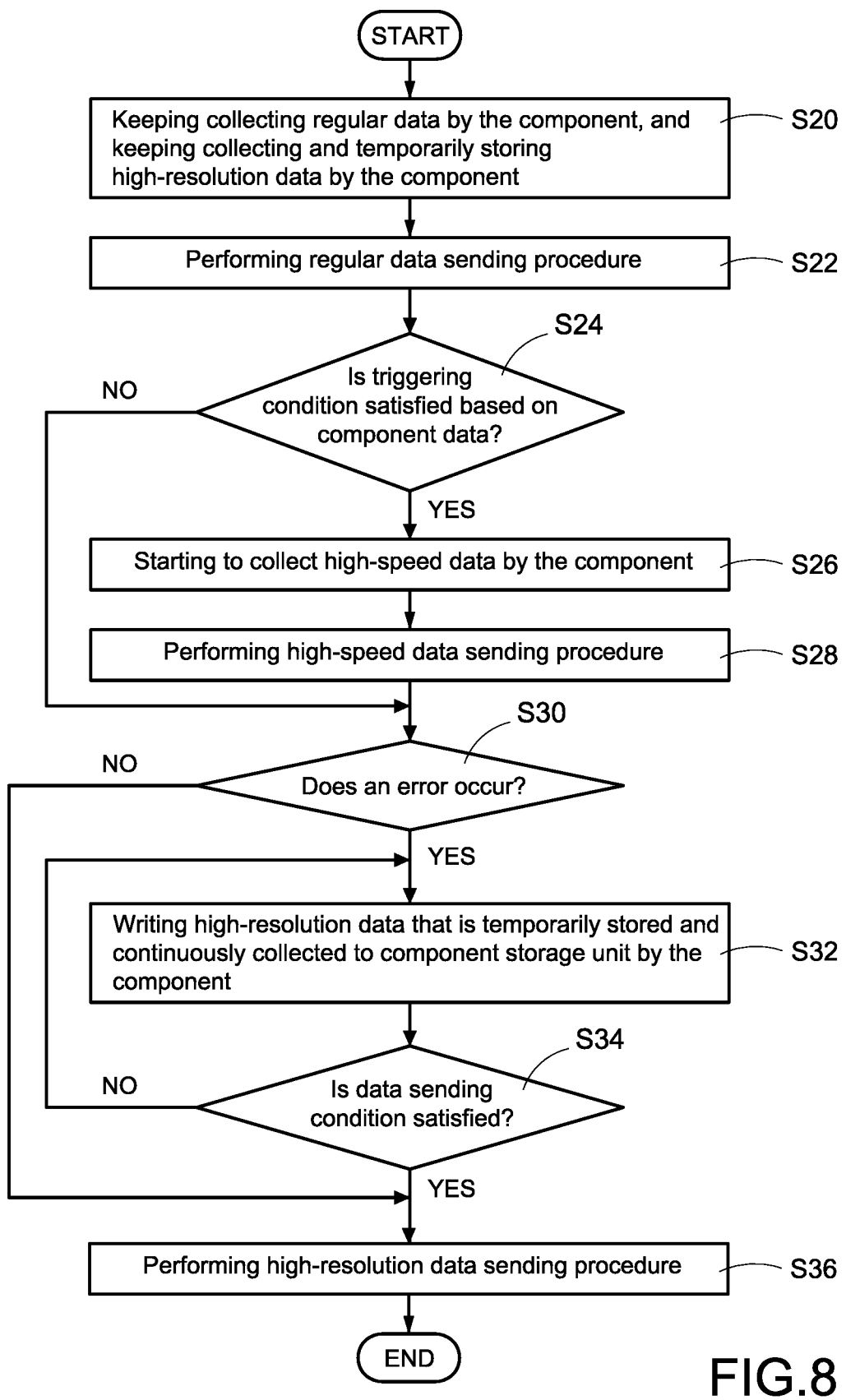
FIG. 8 is a first part of an embodiment of a data collecting flowchart according to the present disclosure.

Please refer to FIG. 8. To implement the collecting method of the present disclosure, at least one component 21 arranged in the electric vehicle 2 keeps collecting a regular data 23 of the component data generated while the electric vehicle 2 is operating, and keeps collecting the high-resolution data 25 of the component data and temporarily storing the high-resolution data 25 (step S20). Next, the component 21 performs the regular data sending procedure through the component communication unit 211 to send the regular data 23 to the bus 22 in accordance with the regular frequency (step S22).

The regular data 23 may be, for example, a bus communication protocol defined by a client-end (such as a KWP2000 protocol), a command for a specific function or mechanism (such as using or turning on/off a light) sent from an upstream controlling component to a downstream controlled component (such as an inverter controls a motor), a physical value of the component itself having a low variation rate or a data that may satisfy the determination requirement with a low sampling rate (such as a battery charge percentage, an error code, an instruction for switching on/off an inverter, a signal to indicate a peripheral component's status like "the kickstand is not stored", "the storage remains open", or a braking signal, etc.).

In one embodiment, the component 21 keeps sampling the regular data 23 from the memory 20 through the component communication unit 211 in accordance with the regular frequency in the step S20 while the electric vehicle 2 is operating, and the component 21 sends the regular data 23 to the bus 22 through the component communication unit 211 in accordance with the regular frequency in the step S22. Besides, the component 21 keeps sampling the high-resolution data 25 from the memory 20 through the high-resolution data collecting unit 214 in accordance with a specific frequency (such as the regular frequency, the high-speed frequency, or other frequencies higher than the transmission rate of the bus 22) and temporarily stores the high-resolution data 25 to the register (not shown) through a first in first out (FIFO) manner in the step S20, so as to perform a data pre-collecting procedure before an error occurs. It should be interpreted that the high-resolution data is the data being pre-collected, so that the component 21 only have to ensure that the data being obtained may be corresponding to the time point that the error occurs, there is no need to set a fixed frequency used by the component 21 to send the high-resolution data 25 to the bus 22.

In the present disclosure, the component 21 samples the component data from the memory 20 through the condition determining unit 212, and determines whether a default triggering condition is satisfied based on the component data (step S24). If the condition determining unit 212 determines that the component data satisfies the triggering condition (route YES of step S24), the condition determining unit 212 activates the high-speed data collecting unit 213 to start sampling the high-speed data 24 of the component data from the memory 20 (step S26). After the step S26, the component 21 performs the high-speed data sending procedure through the component communication unit 211, so as to send the high-speed data 24 to the bus 22 in accordance with the high-speed frequency (step S28).

The high-speed data 24 indicates a bus information (such as a battery voltage, a motor current, a motor voltage, etc.) provided for a predictive debugging requirement before an error occurs, data of the component 21 itself having a high variation rate, or data that may satisfy the determination requirement with a high sampling rate (such as a motor rotation-speed variation, an angle variation of an encoder, physical parameters related to protection purpose such as a current, a voltage, a torque, a temperature variation etc.).

In one embodiment, in the step S26, the component 21 triggers the high-speed data collecting unit 213 to start sampling the high-speed data 24 from the memory 20 in accordance with the high-speed frequency through the condition determining unit 212 after the triggering condition is satisfied, and the component 21 makes the component communication unit 211 to keep sending the high-speed data 24 to the bus 22 in accordance with the high-speed frequency, until the triggering condition is no longer satisfied (route NO of step S24).

In one embodiment, the manufacturer of the component 21 may preset multiple triggering conditions in the firmware of the component 21 with respect to different potential problems, and each of the triggering conditions respectively corresponds to different high-speed data 24. Each of the triggering conditions being satisfied means that a corresponding potential problem is probably to occur or is impending to occur to the component 21, and the high-speed data 24 indicates that the data of the component data that is highly relative to the potential problem. In the step S24, the condition determining unit 212 generates and sends a corresponding activated command to the high-speed data collecting unit 213 to make the high-speed data collecting unit 213 to start collecting the high-speed data 24 corresponding to a specific triggering condition once the collected component data is determined to satisfy the specific triggering condition of the multiple triggering conditions.

For an example, one of the triggering conditions may be set as: "when a first variable exceeds a first threshold". In the step S24, the condition determining unit 212 may determine that the triggering condition is satisfied when the first variable of the component data exceeds the first threshold.

For example, if the first variable is the motor temperature as discussed above, the condition determining unit 212 may determine that the motor temperature satisfies the triggering condition and activate the high-speed data sending procedure when the first variable exceeds a temperature-warning threshold such as 125° C. In the meantime, the condition determining unit 212 controls the high-speed data collecting unit 213 through the activated command and triggers the high-speed data collecting unit 213 to start collecting the first variable and a second variable that is relevant to the first variable. However, the above description is only one of the exemplary embodiments of the present disclosure, but not limited thereto.

When the component 21 keeps collecting and temporarily storing the high-resolution data 25 in the step S20, the component 21 samples the component data from the memory 20 through the error diagnosis unit 215 and determines whether an error occurs based on the sampled component data (step S30). When the error diagnosis unit 215 determines that a part of the component data includes an error condition (route YES of step S30), the component 21 activates the high-resolution data collecting unit 214 to write all the high-resolution data 25 temporarily stored in the register to the component storage unit 216. And, the high-resolution data collecting unit 214 keeps sampling the high-resolution data 25 from the time point that the error occurs and during a time period after the error occurs, and also writes the sampled high-resolution data 25 to the component storage unit 216 (step S32).

The high-resolution data 25 includes bus data (such as an over-current data, an over-voltage data, etc.) defined based on a debugging requirement needed when an error occurs, a physical value of the component 21 itself having an extremely high variation rate, or data that may only satisfy the determination requirement when being sampled with an extremely high sampling rate (such as an Id, an Iq, a torque command, etc.).

For an example, the error diagnosis unit 215 may record multiple error parameters. In the step S30, the error diagnosis unit 215 compares a second variable of the component data with the multiple error parameters, and determines that an error occurs when the comparison result shows that the second variable is satisfying one of the multiple error parameters. For example, when the motor temperature keeps raising and exceeds a temperature-error threshold such as 130° C., the error diagnosis unit 215 releases an error code of OH2. The error diagnosis unit 215 uses the error code to be the second variable to compare with the multiple error parameters (such as OH1, OH2, OH3, etc.), and determines that an error corresponding to a overheat motor temperature occurs. In another embodiment, when the current of the inverter exceeds an error threshold such as 212 A-RMS, the error diagnosis unit 215 releases a corresponding error code of OCN, uses the error code to be the second variable, and determines that an error corresponding to an over-current occurs.

Next, the component 21 determines whether a preset data sending condition is satisfied (step S34). When any of the preset data sending conditions is satisfied (for example, the component storage unit 216 is written to be full of capacity) (route YES of step S34), the component 21 performs the high-resolution data sending procedure through the component communication unit 211 (step S36). During the high-resolution data sending procedure, the component 21 determines a sending frequency (such as the regular frequency, the high-speed frequency, or any other frequencies) according to the loading of the bus 22 and without exceeding the loading of the bus 22, and sends all the high-resolution data 25 stored in the component storage unit 216 to the bus 22 in accordance with the determined sending frequency.

In the embodiment, when the high-resolution data collecting unit 214 writes the high-resolution data 25 to the register and/or the component storage unit 216, the high-resolution data collecting unit 214 adds a correct time label through the timing unit 217 simultaneously. Therefore, the high-resolution data 25 sent to the bus 22 may include a correct time information, and includes all the data with respect to the time point that the error occurs, the first time period before the error occurs, and the second time period after the error occurs.

Figure 9:
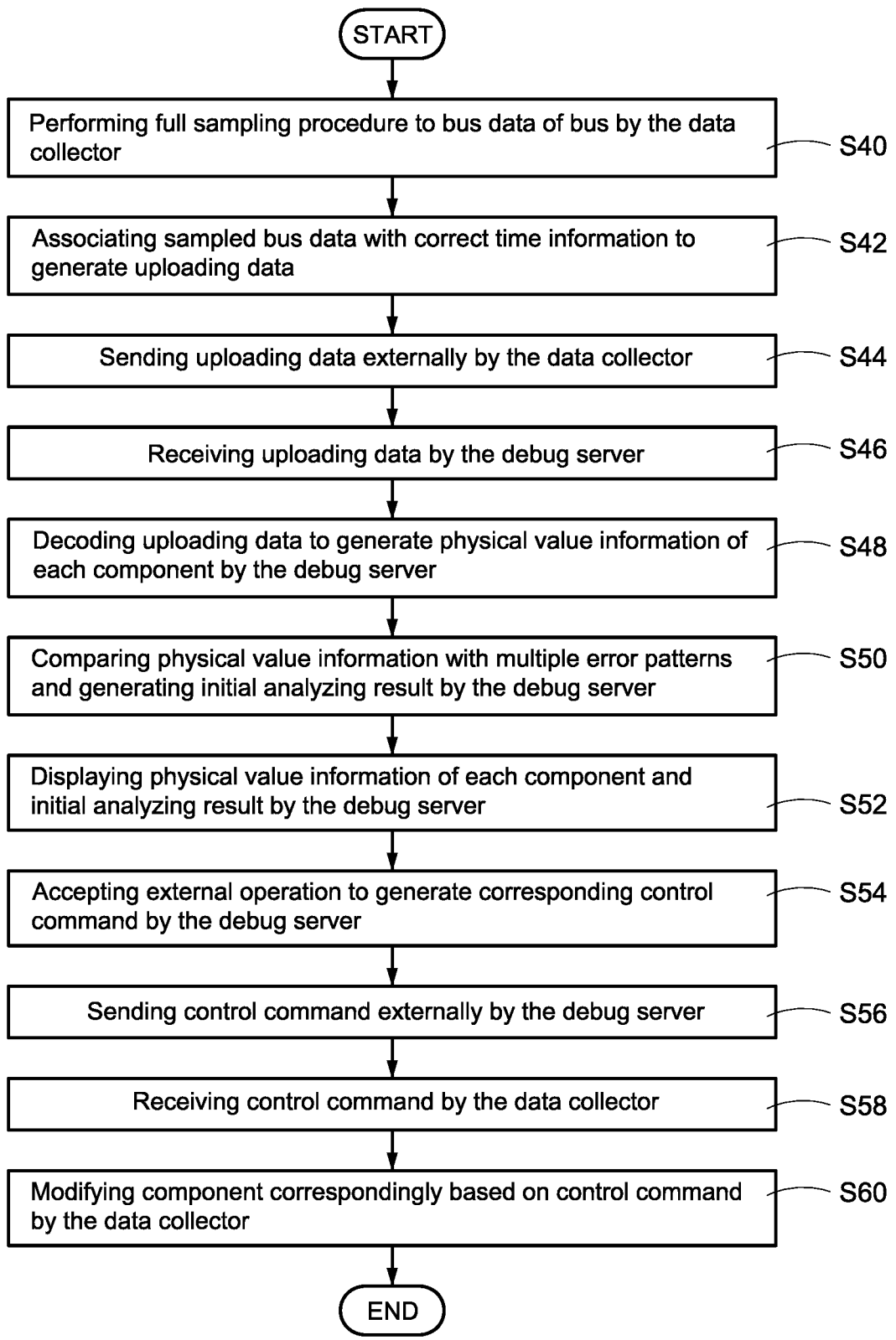
FIG. 9 is a second part of the embodiment of the data collecting flowchart according to the present disclosure.

Please refer to FIG. 9. When the component 21 sends the regular data 23, the high-speed data 24, and the high-resolution data 25 to the bus 22 of the electric vehicle 2, the data collector 3 keeps performing the full sampling procedure to the bus data from the bus 22 (step S40), and then the data collector 3 associates the sampled bus data with the correct time information to generate the uploading data (step S42).

In particular, the component 21 in the present disclosure uses different frequencies (i.e., the regular frequency and the high-speed frequency) and different data collecting approaches (i.e., a continuous collecting approach and a pre-collecting approach) to dynamically send different data (i.e., the regular data 23, the high-speed data 24, and the high-resolution data 25) to the bus 22, so as to use the bandwidth of the bus 22 flexibly and reduce the loading of the bus 22. Hence, the data collector 3 may use the full sampling procedure to collect all the data transmitted on the bus 22 without using a partial sampling procedure and a compression procedure. Therefore, the collected data may be prevented from losing, the data resolution of the collected data may be increased, the engineer 5 may be assisted to effectively reproduce and analyze the error.

After the step S42, the data collector 3 sends the uploading data externally (step S44), and the debug server 4 receives the uploading data sent by the data collector 3 (step S46). After receiving the uploading data, the debug server 4 compares the uploading data with multiple pre-stored error patterns, and then generates and displays a comparison result immediately. Through the comparison result, the engineer 5 may easily and quickly determine the situation of each of the components 21 of the electric vehicle 2 at the very time. Also, the engineer 5 may determine whether an error occurs or not, how to reproduce the error, the actual cause that results in the error, the repair manner for the error, etc.

In particular, after the step S46, the debug server 4 firstly decodes the uploading data through the decoding unit 43 to generate the original physical value information of each of the components 21 (step S48). Next, the debug server 4 compares the physical value information with the multiple error patterns through the diagnosis unit 44 for analysis, and generates an initial analyzing result (step S50). Therefore, the debug server 4 may display the physical value information of each component 21 and the initial analyzing result generated based on the physical value information simultaneously on the human machine interface 45 (step S52). According to the data displayed on the human machine interface 45, the engineer 5 may easily and quickly analyze the situation of the electric vehicle 2 at the very time.

The collecting method of the present disclosure may provide the data of the component 21 and the initial analyzing result to the engineer 5 through the debug server 4, in addition, if the engineer 5 considers to modify or add the collected data after checking the information provided through the debug server 4, the engineer 5 may refer to the error patterns pre-defined in the error database 46, and remotely modify each of the components 21 directly through the debug server 4. For example, the engineer 5 may directly modify a data sampling frequency of each component 21, define a new triggering condition for the condition determining unit 212, set a new error pattern to the error diagnosis unit 215, etc., through the debug server 4, but not limited thereto.

In particular, the debug server 4 may accept an external operation made by the engineer 5 through the human machine interface 45 to generate a corresponding control command C1 (step S54). Next, the debug server 4 sends the control command C1 externally (step S56), and then the data collector 3 receives the control command C1 sent from the debug server 4 (step S58).

After receiving the control command C1, the data collector 3 connects to a corresponding one of the components 21 indicated by the content of the control command C1 through the bus 22 of the electric vehicle 2, and modifies the corresponding one of the components 21 based on the content of the control command C1 (step S60). In one embodiment, the content of the control command C1 may be but not limited to, modifying the content of the regular data 23, the high-speed data 24 or the high-resolution data 25 sent by the component 21, modifying the data sampling frequency or the data sending frequency used by the component 21, modifying the triggering condition of the high-speed data sending procedure, modifying the error parameters used to determine whether an error occurs, updating the firmware of the component 21, etc., but not limited thereto.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A component of an electric vehicle, arranged in the electric vehicle and connected to a bus of the electric vehicle, comprising:
a memory, wherein the component is configured to sample component data of the electric vehicle in accordance with an ultrahigh-speed frequency that is higher than a regular frequency and a high-speed frequency and record the sampled component data to the memory;
a component communication unit connected to the memory, continuously collecting a regular data of the component data from the memory in accordance with the regular frequency, and performing a regular data sending procedure to send the regular data to the bus in accordance with the regular frequency;
a condition determining unit connected to the memory, recording at least one triggering condition, and determining whether the triggering condition is satisfied based on the component data of the memory;
a high-speed data collecting unit connected with the condition determining unit, the component communication unit, and the memory, and being triggered by the condition determining unit to start continuously collecting a high-speed data of the component data from the memory in accordance with the high-speed frequency after the component data is determined to satisfy the triggering condition, wherein the component communication unit is configured to perform a high-speed data sending procedure to send the high-speed data to the bus in accordance with the high-speed frequency, wherein the high-speed frequency is higher than the regular frequency;

a component storage unit connected with the component communication unit;

a high-resolution data collecting unit connected to the component storage unit and the memory, continuously collecting a high-resolution data of the component data from the memory and temporarily storing the high-resolution data to a register;

an error diagnosis unit connected with the high-resolution data collecting unit and the memory, and determining whether an error occurs based on the component data of the memory; and a timing unit, connected with the high-resolution data collecting unit;

wherein the error diagnosis unit is configured to trigger the high-resolution data collecting unit after the error occurs for the high-resolution data collecting unit to write the high-resolution data temporarily stored in the register to the component storage unit and directly write the continuously collected high-resolution data to the component storage unit, and the component communication unit is configured to perform a high-resolution data sending procedure to send the high-resolution data being stored to the component storage unit at a time point when the error occurs, being stored to the register within a first time period before the error occurs, and being stored to the component storage unit within a second time period after the error occurs, from the component storage unit to the bus, wherein the high-resolution data stored in the component storage unit comprises a time information provided by the timing unit.

2. The component of claim 1, wherein the bus is a controller area network (CAN) bus.

3. The component of claim 2, wherein the condition determining unit is configured to collect the component data from the memory and determine whether the triggering condition is satisfied based on a first determination of whether a first variable of the component data exceeds a specific threshold, and the error diagnosis unit is configured to collect the component data from the memory and determine whether the error occurs based on a second determination of whether a second variable of the component data matches an error parameter.

4. A data collecting system for an electric vehicle, comprising:

a component, arranged in the electric vehicle and connected with a bus of the electric vehicle, the component is configured to perform a regular data sending procedure, a high-speed data sending procedure, and a high-resolution data sending procedure, wherein the regular data sending procedure is performed to keep collecting a regular data of a component data of the electric vehicle and sending the regular data to the bus in accordance with a regular frequency, wherein the high-speed data sending procedure is performed to start collecting a high-speed data of the component data when satisfying at least one triggering condition and sending the high-speed data to the bus in accordance with a high-speed frequency that is higher than the regular frequency, wherein the high-resolution data sending procedure is performed to keep collecting and temporarily storing a high-resolution data of the component data to a register, writing the high-resolution data with a time information that is temporarily stored in the register and continuously collected after an error occurs, to a component storage unit, and sending the high-resolution data being stored to the component storage unit at a time point when the error occurs, being stored to the register within a first time period before the error occurs, and being stored to the component storage unit within a second time period after the error occurs, from the component storage unit to the bus;

a data collector, connected to the bus to perform a full sampling procedure to a bus data of the bus, wherein the data collector comprises a time correction unit, a first communication unit, and a processing unit, the full sampling procedure is performed to obtain all the bus data respectively sent from different components of the electric vehicle to the bus in accordance with different procedures, the time correction unit is configured to connect to a network time protocol server to obtain a time information through the first communication unit, the processing unit is configured to associate the bus data with the time information to generate an uploading data, wherein the bus data comprises the regular data, the high-speed data, and the high-resolution data; and a debug server, connected with the first communication unit of the data collector to receive the uploading data, wherein the debug server comprises an error database and a diagnosis unit, the error database is configured to store multiple error patterns, the diagnosis unit is configured to compare the uploading data with the multiple error patterns and display a comparison result in real-time.

5. The data collecting system of claim 4, wherein the component comprises a memory, the memory is configured to perform the full sampling procedure to the component data of the electric vehicle in accordance with an ultrahigh-speed frequency that is higher than the regular frequency and the high-speed frequency, wherein the component is configured to collect the component data from the memory;

wherein, the component is configured to determine whether the triggering condition is satisfied based on a first determination of whether a first variable of the component data exceeds a specific threshold, and the component is configured to determine whether the error occurs based on a second determination of whether a second variable of the component data matches an error parameter.

6. The data collecting system of claim 4, wherein the bus is a controller area network (CAN) bus, and the data collector further comprises:

a second communication unit connected with the time correction unit and the processing unit, wherein the data collector is configured to connect with the bus through the second communication unit to send the time information to the component of the bus and sample the bus data of the bus;

a collector memory, connected with the processing unit;

a collecting unit, connected with the second communication unit and the processing unit, collecting the bus data sampled by the second communication unit, and temporarily storing the bus data to the collector memory through the processing unit; and a collector storage unit, connected with the processing unit, storing the uploading data when the processing unit is incapable of sending the uploading data to the debug server through the first communication unit.

7. The data collecting system of claim 6, wherein the debug server further comprises:

a server communication unit, connected with the data collector, receiving the uploading data;

a server storage unit, connected with the server communication unit, storing the uploading data;

a decoding unit, connected with the server storage unit and the diagnosis unit, decoding the uploading data to generate an actual physical value, wherein the diagnosis unit is configured to compare the actual physical value with the multiple error patterns to generate the comparing result; and a human machine interface, connected with the error database and the diagnosis unit, displaying the comparing result, and accepting an external operation to edit the multiple error patterns recorded in the error database.

8. The data collecting system of claim 7, wherein the human machine interface is connected with the server communication unit, and is configured to receive the external operation to send a control command to the data collector through the server communication unit, and the data collector is configured to modify the component based on the control command, wherein a content of the control command comprises at least one of modifying a content of the regular data, modifying a content of the high-speed data, modifying a content of the high-resolution data, modifying a data sampling frequency or a data sending frequency of the component, modifying the triggering condition of the high-speed data sending procedure, modifying an error parameter used to determine whether the error occurs, and updating a firmware of the component.

9. A data collecting method for an electric vehicle, incorporated with a data collecting system for the electric vehicle, the data collecting system comprising a component arranged in the electric vehicle, a data collector connected with the component through a bus of the electric vehicle, and a debug server connected with the data collector, and the data collecting method comprising:

a) continuously collecting, by the component, a regular data of a component data of the component and performing a regular data sending procedure to send the regular data to the bus in accordance with a regular frequency;

b) determining, by the component, whether a triggering condition is satisfied based on the component data;

c) continuously collecting, by the component, a high-speed data of the component data after the component data is determined to satisfy the triggering condition, and performing a high-speed data sending procedure to send the high-speed data to the bus in accordance with a high-speed frequency, wherein the high-speed frequency is higher than the regular frequency;

d) continuously collecting, by the component, a high-resolution data of the component data, and temporarily storing the high-resolution data to a register;

e) determining, by the component, whether an error occurs based on the component data;

f) storing, by the component, the high-resolution data temporarily stored in the register and continuously collected, to a component storage unit, when the error occurs;

g) after the step f), performing, by the component, a high-resolution data sending procedure to send the high-resolution data being stored to the component storage unit at a time point when the error occurs, being stored to the register within a first time period before the error occurs, and being stored to the component storage unit within a second time period after the error occurs, from the component storage unit to the bus, wherein the high-resolution data comprises a time information;

h) performing, by the data collector, a full sampling procedure to a bus data of the bus, wherein the full sampling procedure is performed to obtain all the bus data respectively sent from different components of the electric vehicle to the bus in accordance with different procedures, and the bus data comprises the regular data, the high-speed data, and the high-resolution data;

i) associating, by the data collector, the sampled bus data with a correct time to generate an uploading data;

j) receiving, by the debug server, the uploading data from the data collector; and k) comparing, by the debug server, the uploading data with multiple pre-stored error patterns and displaying a comparison result immediately.

10. The data collecting method of claim 9, wherein the component comprises a memory, the memory is configured to perform the full sampling procedure to the component data of the electric vehicle in accordance with an ultrahigh-speed frequency that is higher than the regular frequency and the high-speed frequency;

wherein the step b) comprises collecting the component data from the memory, and determining whether the triggering condition is satisfied based on a first determination of whether a first variable of the component data exceeds a certain threshold; and wherein the step e) comprises collecting the component data from the memory, and determining whether the error occurs based on a second determination of whether a second variable of the component matches an error parameter.

11. The data collecting method of claim 10, further comprising:

l) accepting, by the debug server, an external operation to generate a control command;

m) receiving, by the data collector, the control command; and n) modifying, by the data collector, the component in accordance with a content of the control command, wherein the content of the control command comprises at least one of modifying a content of the regular data, modifying a content of the high-speed data, modifying a content of the high-resolution data, modifying a data sampling frequency or a data sending frequency of the component, modifying the triggering condition of the high-speed data sending procedure, modifying the error parameter, and updating a firmware of the component.

* * * * *